United States Patent
Park et al.

(10) Patent No.: US 9,386,614 B2
(45) Date of Patent: Jul. 5, 2016

(54) APPARATUS AND METHOD FOR OPTIMIZING DATA-PATH IN MOBILE COMMUNICATION NETWORK

(71) Applicant: Samsung Electronics Co., Ltd., Gyeonggi-do (KR)

(72) Inventors: Jung-Shin Park, Seoul (KR); Yegin Alper, Istanbul (TR); Won-Il Roh, Gyeonggi-do (KR); Yeong-Moon Son, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 42 days.

(21) Appl. No.: 14/254,856

(22) Filed: Apr. 16, 2014

(65) Prior Publication Data
US 2014/0307573 A1    Oct. 16, 2014

(30) Foreign Application Priority Data
Apr. 16, 2013    (KR) .................. 10-2013-0041444

(51) Int. Cl.
*H04W 76/02*    (2009.01)
*H04W 40/00*    (2009.01)

(52) U.S. Cl.
CPC ............ *H04W 76/022* (2013.01); *H04W 40/00* (2013.01)

(58) Field of Classification Search
None
See application file for complete search history.

(56) References Cited

U.S. PATENT DOCUMENTS

| | | |
|---|---|---|
| 2008/0080533 A1 | 4/2008 | Yamane |
| 2008/0095118 A1 | 4/2008 | Cakulev et al. |
| 2010/0002712 A1 | 1/2010 | Suzuki et al. |
| 2010/0182917 A1 | 7/2010 | Valko et al. |
| 2011/0026488 A1 | 2/2011 | Patel et al. |
| 2011/0261787 A1 | 10/2011 | Bachmann et al. |
| 2013/0070731 A1 | 3/2013 | Lim et al. |
| 2013/0242918 A1* | 9/2013 | Zhou ..................... H04W 8/082 370/329 |
| 2013/0308529 A1* | 11/2013 | Schramm ............ H04W 76/021 370/328 |

FOREIGN PATENT DOCUMENTS

| | | |
|---|---|---|
| WO | WO 2012/002709 A2 | 1/2012 |
| WO | WO 2012/058819 A1 | 5/2012 |

OTHER PUBLICATIONS

International Search Report dated Jul. 18, 2014 in connection with International Patent Application No. PCT/KR2014/003295, 3 pages.
Written Opinion of the International Searching Authority dated Jul. 18, 2014 in connection with International Patent Application No. PCT/KR2014/003295, 5 pages.

* cited by examiner

*Primary Examiner* — Brian Roberts

(57) ABSTRACT

A method for optimizing a data-path by a source Base Station (BS) in a mobile communication network includes determining whether a tunnel among new BSs is set up while tracking a data-flow for a Mobile Station (MS), if the tunnel among the new BSs is set up, determining whether there is a bounce-back, if there is at least one bounce-back, transmitting a first message for detecting a root of an arbitrary bounce-back among the at least one bounce-back and setting up a short-cut tunnel to other end of the arbitrary bounce-back, and after transmitting the first message, receiving a second message including bounce-back root information indicating the root of the arbitrary bounce-back from the other end of the arbitrary bounce-back. Other various embodiments including a source BS, a target BS, and a backhaul network are also disclosed.

20 Claims, 13 Drawing Sheets

APPARATUS AND METHOD FOR OPTIMIZING DATA-PATH IN MOBILE COMMUNICATION NETWORK

CROSS-REFERENCE TO RELATED APPLICATION AND CLAIM OF PRIORITY

The present application is related to and claims the benefit under 35 U.S.C. §119(a) of a Korean patent application No. 10-2013-0041444 filed in the Korean Intellectual Property Office on Apr. 16, 2013, the entire disclosure of which is incorporated herein by reference.

TECHNICAL FIELD

The present disclosure relates generally to an apparatus and method for optimizing a data-path in a mobile communication network, and more particularly, to an apparatus and method for optimizing a data-path by removing a bounce-back in a mobile communication network.

BACKGROUND

A current mobile communication network such as a $3^{rd}$ Generation Project Partnership™ (3GPP™), a Worldwide Interoperability for Microwave Access™ (WiMAX™), and a $3^{rd}$ Generation Project Partnership 2™ (3GPP2™) includes Radio Access Networks (RANs) and Core Networks (CNs). The RANs are formed by a plurality of Base Stations (BSs) which provide a radio access to Mobile Stations (MSs). The CNs are formed by routers and various servers that mainly provide a subscriber account management and an MS access to an internet and services per core. A connection between a RAN and a CN is provided by a transport network as a backhaul network.

The RAN and the CN may or may not belong to the same mobile operators. The backhaul network may be operated by a network operator that neither operates the RAN nor the CN. A backhaul operation incurs significant operational cost to a Mobile Network Operator (MNO), so an effective use for the backhaul operation may be an important business objective of the MNO.

In the mobile communication network, there is a concept of a flat network architecture where data packets to and from the MSs are not forced to transfer through the CN. In the mobile communication network, the RAN operates as an Internet Protocol (IP) gateway of the MS. Nevertheless, the backhaul network is used for connecting the BSs to remaining entities of the IP network.

SUMMARY

To address the above-discussed deficiencies, it is a primary object to provide an apparatus and method for optimizing a data-path in a mobile communication network.

Another aspect of the present disclosure is to provide an apparatus and method for optimizing a data-path by removing a bounce-back in a mobile communication network.

In accordance with an aspect of the present disclosure, a source Base Station (BS) in a mobile communication network is provided. The source BS includes a controller configured to determine whether a tunnel among new BSs is set up while tracking a data-flow for a Mobile Station (MS), and determine whether there is a bounce-back if the tunnel among the new BSs is set up, a transmitter configured to transmit a first message for detecting a root of an arbitrary bounce-back among at least one bounce-back and setting up a short-cut tunnel to other end of the arbitrary bounce-back if there is the at least one bounce-back, and a receiver configured to receive a second message including bounce-back root information indicating the root of the arbitrary bounce-back from the other end of the arbitrary bounce-back after the transmitter transmits the first message.

In accordance with another aspect of the present disclosure, a backhaul network node in a mobile communication network is provided. The backhaul network node includes a receiver configured to receive a message, and a controller configured to determine whether there is a bounce-back if a received message is not a message which requests to release a short-cut tunnel, and execute a bounce-back detection algorithm and perform an operation related to the message with other end of the bounce-back if there is the bounce-back.

In accordance with another aspect of the present disclosure, a target Base Station (BS) in a mobile communication network is provided. The target BS includes a controller configured to release a short-cut tunnel if a received message is a message which requests to release the short-cut tunnel, and a transmitter configured to transmit a response message to the message to a root for a bounce-back.

In accordance with another aspect of the present disclosure, a method for optimizing a data-path by a source Base Station (BS) in a mobile communication network is provided. The method includes determining whether a tunnel among new BSs is set up while tracking a data-flow for a Mobile Station (MS), if the tunnel among the new BSs is set up, determining whether there is a bounce-back; if there is at least one bounce-back, transmitting a first message for detecting a root of an arbitrary bounce-back among the at least one bounce-back and setting up a short-cut tunnel to other end of the arbitrary bounce-back, and after transmitting the first message, receiving a second message including bounce-back root information indicating the root of the arbitrary bounce-back from the other end of the arbitrary bounce-back.

In accordance with another aspect of the present disclosure, a method for optimizing a data-path by a backhaul network node in a mobile communication network is provided. The method includes determining whether there is a bounce-back if a received message is not a message which requests to release a short-cut tunnel; and executing a bounce-back detection algorithm and performing an operation related to the message with other end of the bounce-back if there is the bounce-back.

In accordance with another aspect of the present disclosure, a method for optimizing a data-path by a target Base Station (BS) in a mobile communication network is provided. The method includes releasing a short-cut tunnel if a received message is a message which requests to release the short-cut tunnel; and transmitting a response message to the message to a root for a bounce-back.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
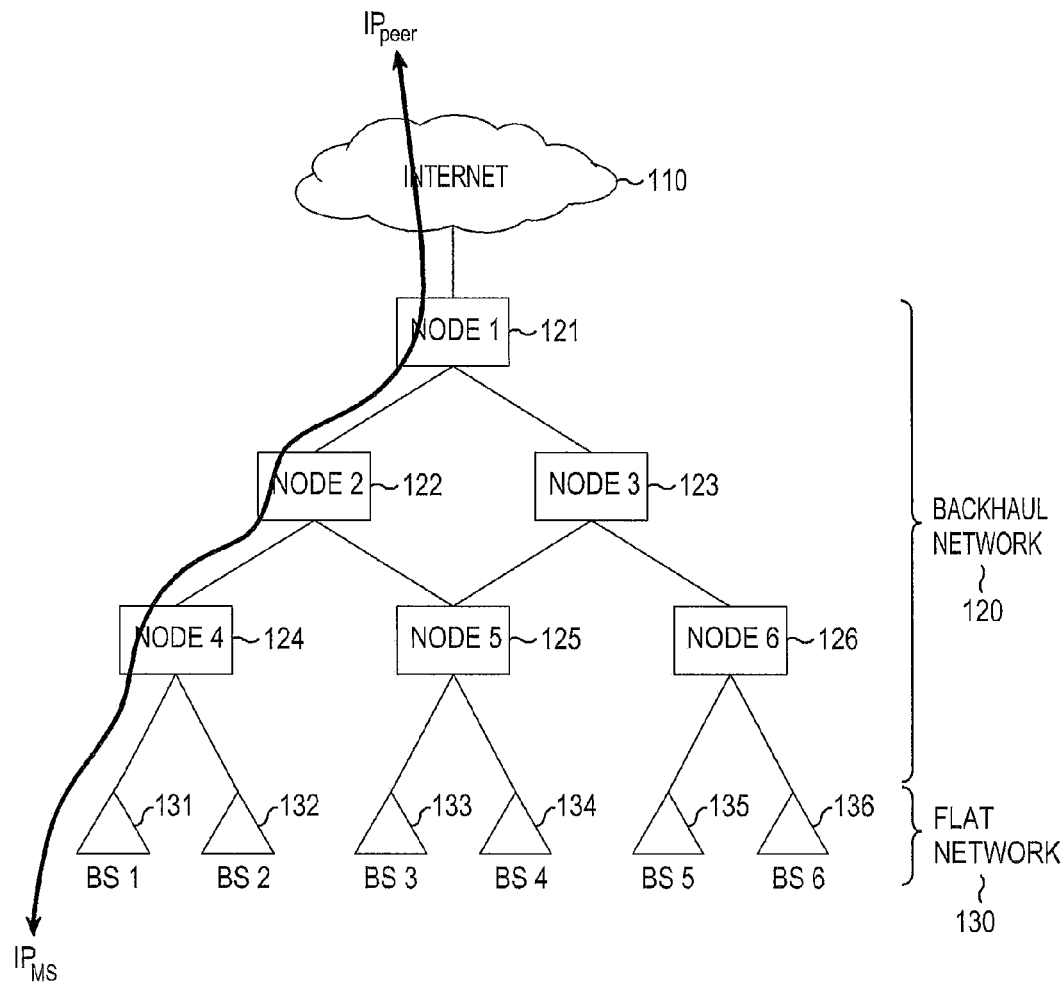
FIG. 1 schematically illustrates a flat network architecture where a backhaul network is separated from a RAN in a mobile communication network.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," if used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes an apparatus and method for optimizing a data-path in a mobile communication network.

An embodiment of the present disclosure proposes an apparatus and method for optimizing a data-path by removing a bounce-back in a mobile communication network.

A method and apparatus proposed in various embodiments of the present disclosure can be applied to various communication systems such as a Long Term Evolution™ (LTE™) mobile communication system, an LTE-Advanced™ (LTE-A™) mobile communication system, a High Speed Downlink Packet Access™ (HSDPA™) mobile communication system, a High Speed Uplink Packet Access™ (HSUPA™) mobile communication system, a High Rate Packet Data™ (HRPD™) mobile communication system proposed in a 3rd Generation Project Partnership 2™ (3GPP2™), a Wideband Code Division Multiple Access™ (WCDMA™) mobile communication system proposed in the 3GPP2™, a Code Division Multiple Access™ (CDMA™) mobile communication system proposed in the 3GPP2™, an Institute of Electrical and Electronics Engineers™ (IEEE™) mobile communication system, an Evolved Packet System (EPS), a Mobile Internet Protocol (Mobile IP) system, and/or the like.

Hereinafter, it will be assumed that the mobile communication network has a distributed structure. Even though various embodiments of the present disclosure are explained using Base Stations (BSs) which are connected to backhaul network nodes, and a context of Mobile Stations (MSs), it will be understood by those of ordinary skill in the art that various embodiments of the present disclosure are not limited to these specific cases. Various embodiments of the present disclosure may be applied to an arbitrary type of network element such as a router, a switch, etc which provides an Internet Protocol (IP) access to an arbitrary type of network element such MSs, fixed hosts, devices, etc. by using BSs or by not using the BSs at an edge.

In embodiments of the present disclosure, a bounce-back is defined as a situation where IP packets are transmitted back and forth between two network elements before being transmitted towards a final destination.

A flat network architecture where a backhaul network is separated from a RAN in a mobile communication network will be described with reference to FIG. 1.

FIG. 1 schematically illustrates a flat network architecture where a backhaul network is separated from a RAN in a mobile communication network.

Referring to FIG. 1, the mobile communication network includes an internet 110, a backhaul network 120, and a flat network 130.

The backhaul network 120 includes a plurality of nodes, i.e., a node1 121. a node2 122, a node3 123, a node4 124, and a node5 125. The flat network 130 includes a plurality of BSs, i.e., a BS1 131, a BS2 132, a BS3 133, a BS4 134, a BS5 135, and a BS6 136. The backhaul network 120 is operated by an Access Service Provider (ASP), and the flat network 130 is operated by an MNO.

The backhaul network 120 can have various different topologies. An interconnection among the BSs and the nodes within the backhaul network 120 can be wired (e.g., a fiber-optic, a copper, etc.) or wireless (e.g., a $4^{th}$ Generation (4G), a microwave, etc.). In FIG. 1, an end-to-end IP communication between an MS (not shown in FIG. 1) of which an IP address is $IP_{MS}$ and a communication peer follows a data-path through the node1 121, the node2 122, the node4 124, and the BS1 131. Here, an IP address of the communication peer is $IP_{peer}$.

In a flat network, an MS can change a BS to which the MS attaches and an IP address of the MS can be changed according to a location of a new BS in an IP network topology. The change normally disrupts an ongoing IP communication. A method of preventing the disruption is a method of maintaining an IP address of the MS despite base station changes with a help of data-path anchoring at an original BS that assigns the IP address, i.e., a source BS (s-BS). The method requires the s-BS to perform a tunneling operation on IP packets to and from a target BS (t-BS) (it will be assumed that the t-BS is a BS which currently provides a service to the MS).

An end-to-end data-path between an MS and a communication peer which is transferred through a s-BS and a t-BS in a mobile communication network will be described with reference to FIG. 2.

Figure 2:
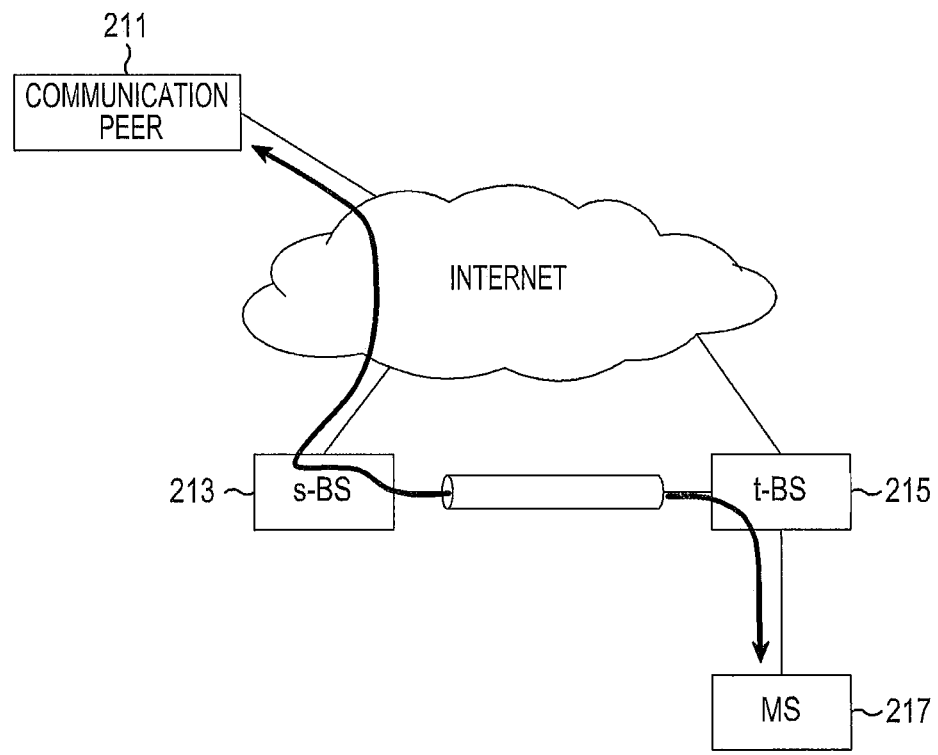
FIG. 2 schematically illustrates an end-to-end data-path between an MS and a communication peer which is transferred through a s-BS and a t-BS in a mobile communication network.

FIG. 2 schematically illustrates an end-to-end data-path between an MS and a communication peer which is transferred through a s-BS and a t-BS in a mobile communication network.

Referring to FIG. 2, an MS 217 and a communication peer 211 form an end-to-end data-path which goes through a s-BS 213 and a t-BS 215.

In FIG. 2, it will be noted that details of a backhaul network are not shown for brevity.

An end-to-end data-path between an MS and a communication peer which is transferred through a s-BS and a t-BS in a mobile communication network has been described with reference to FIG. 2, and an initial end-to-end data-path between an MS and a communication peer in a mobile communication network will be described with reference to FIG. 3.

Figure 3:
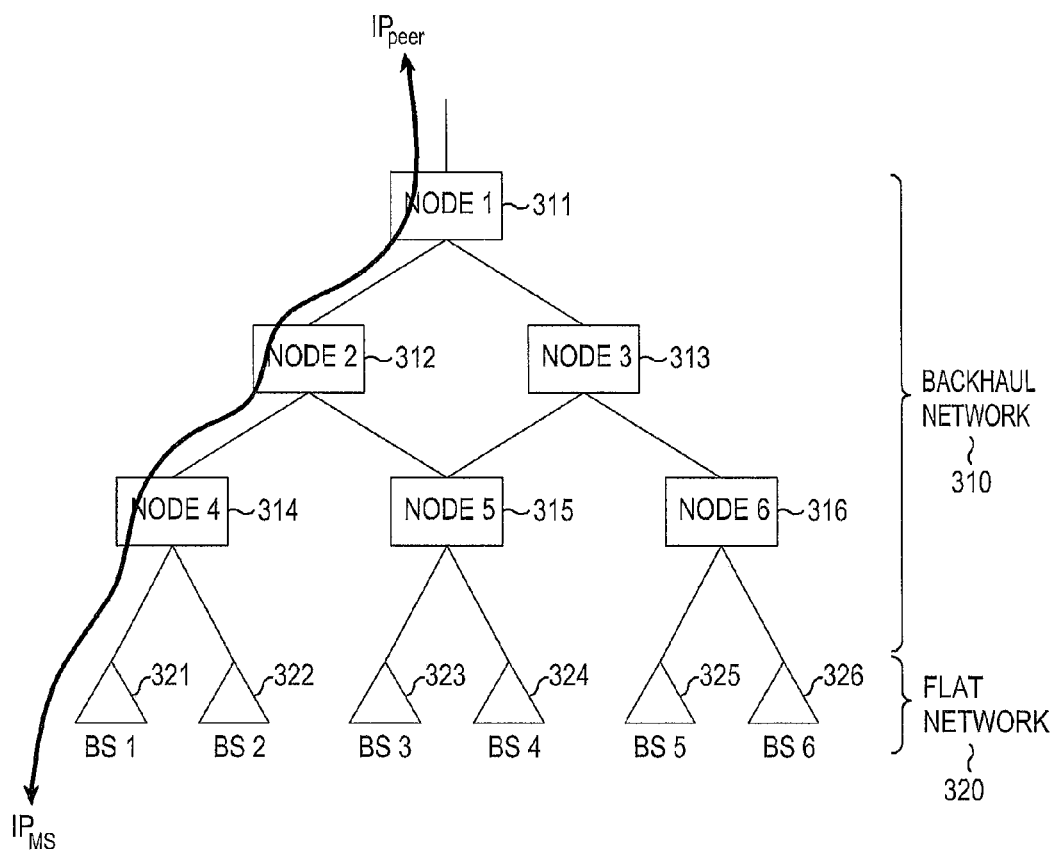
FIG. 3 schematically illustrates an initial end-to-end data-path between an MS and a communication peer in a mobile communication network.

FIG. 3 schematically illustrates an initial end-to-end data-path between an MS and a communication peer in a mobile communication network.

Referring to FIG. 3, the mobile communication network includes a backhaul network 310, a flat network 320, an MS (not shown in FIG. 3), and a communication peer (not shown in FIG. 3) of the MS. The backhaul network 310 includes a plurality of nodes, i.e., a node1 311, a node2 312, a node3 313, a node4 314, a node5 315, and a node6 316. The flat network 320 includes a plurality of BSs, i.e., a BS1 321, a BS2 322, a BS3 323, a BS4 324, a BS5 325, and a BS6 326.

It will be assumed that the MS has acquired an IP address (IPMS) of the MS from the BS1 321.

It will be assumed that the MS detaches from the BS1 321 and accesses the BS2 322 due to mobility of the MS. In order to provide session continuity between the MS and the communication peer, the MS is allowed to continue using the $IP_{MS}$ as a current IP address of the MS (the $IP_{MS}$ is obtained from the BS1 321) if the MS accesses the BS2 322. IP packets for the MS are forwarded between the BS1 321 and the BS2 322 through a tunnel $Tun_x$.

An initial end-to-end data-path between an MS and a communication peer in a mobile communication network has been described with reference to FIG. 3, and a updated end-to-end data-path between an MS and a communication peer in a mobile communication network will be described with reference to FIG. 4.

Figure 4:
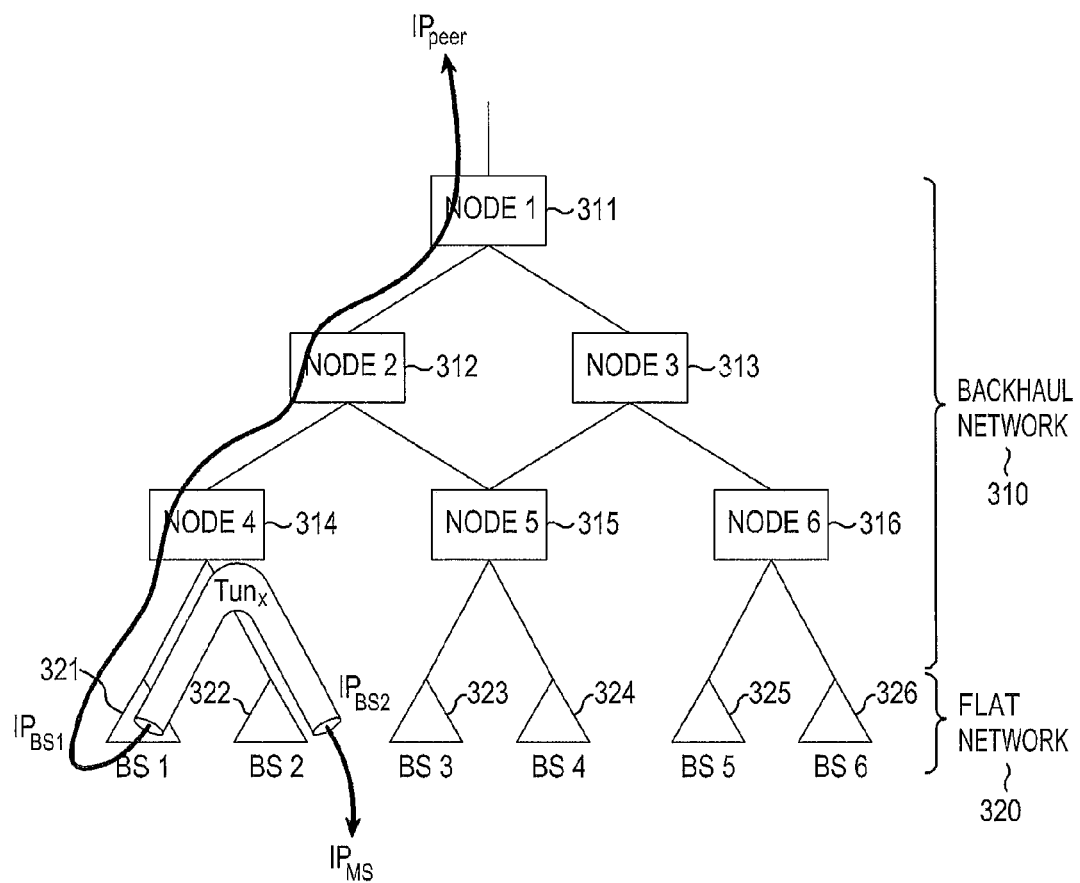
FIG. 4 schematically illustrates a updated end-to-end data-path between an MS and a communication peer in a mobile communication network.

FIG. 4 schematically illustrates a updated end-to-end data-path between an MS and a communication peer in a mobile communication network.

It will be noted that a structure of a mobile communication network in FIG. 4 is identical to a structure of a mobile communication network in FIG. 3. IPBS1 denotes an IP address of a BS1 321, and IPBS2 denotes an IP address of a BS2 322. That is, the IPBS1 and IPBS2 are IP addresses of end-points of a tunnel Tunx.

As described in FIG. 4, the updated data-path in FIG. 4 is a sub-optimal data-path. IP packets which are input from the communication peer need to be transferred to the BS1 321 through the node4 314, and are re-input to the node4 314 inside a tunnel to be forwarded to the BS2 322. IP packets transferred between the node4 314 and the BS 1 321 are encountering unnecessary transmission. That is, in FIG. 4, an ideal data-path between the MS and the communication peer is a data-path which follows the node1 311, the node2 312, the node4 314, and the BS2 322. An extra round-trip between the node4 314 and the BS1 321 consumes network resources. For example, the extra round-trip between the node4 314 and the BS1 321 consumes network resources such as processing in the BS1 321 and the node4 314, a bandwidth in a transmission link between the BS1 321 and the node4 314, etc. So, the network resource consumption due to the extra round-trip can result in an additional cost, and a problem in operating networks by network operators.

For example, in FIG. 4, there is a bounce-back between a node4 314 and a BS1 321.

In order to optimize the data-path, a mobile communication network needs to identify whether there is a bounce-back for a given data-path. If the BS1 321 detects that a new data flow is established, for example, if a new data flow between $IP_{peer}$ as an IP address of a communication peer for an MS and $IP_{MS}$ as an IP address of the MS is established, the BS1 321 triggers the bounce-back detection.

The BS1 321 detects where IP packets are arrived from. For example, in FIG. 4, the BS1 321 detects that received IP packets for the $IP_{MS}$ are arrived from the node4 314. A typical scheme among schemes to detect where IP packets are arrived from is a scheme to detect a source link-layer address of the IP packets, and the source link-layer address of the IP packets can be a source link-layer address of the node4 314.

The BS1 321 determines where the IP packets are being forwarded to. In FIG. 4, the BS1 321 detects that the IP packets that are destined to the $IP_{MS}$ are forwarded to the node4 314 after an encapsulation. One scheme among schemes to determine where the IP packets are being forwarded to is a scheme to detect a forwarding table of the BS1 321 and determine where IP packets for $IP_{BS2}$ (a destination of tunnel encapsulating IP packets for the $IP_{MS}$) are being forwarded to. After recognizing that where IP packets are coming from is the same as where the IP packets are being forwarded to (for example, the IP packets can be input from the node4 314, and the IP packets can be forwarded to the node4 314), the BS 1 321 determines that there is a bounce-back.

Upon detecting a bounce-back, the BS1 321 transmits a control message to other end of the bounce-back in order to set up a short-cut tunnel.

An example of a data-path after a short-cut tunnel is set up in a mobile communication network according to an embodiment of the present disclosure will be described with reference to FIG. 5.

Figure 5:
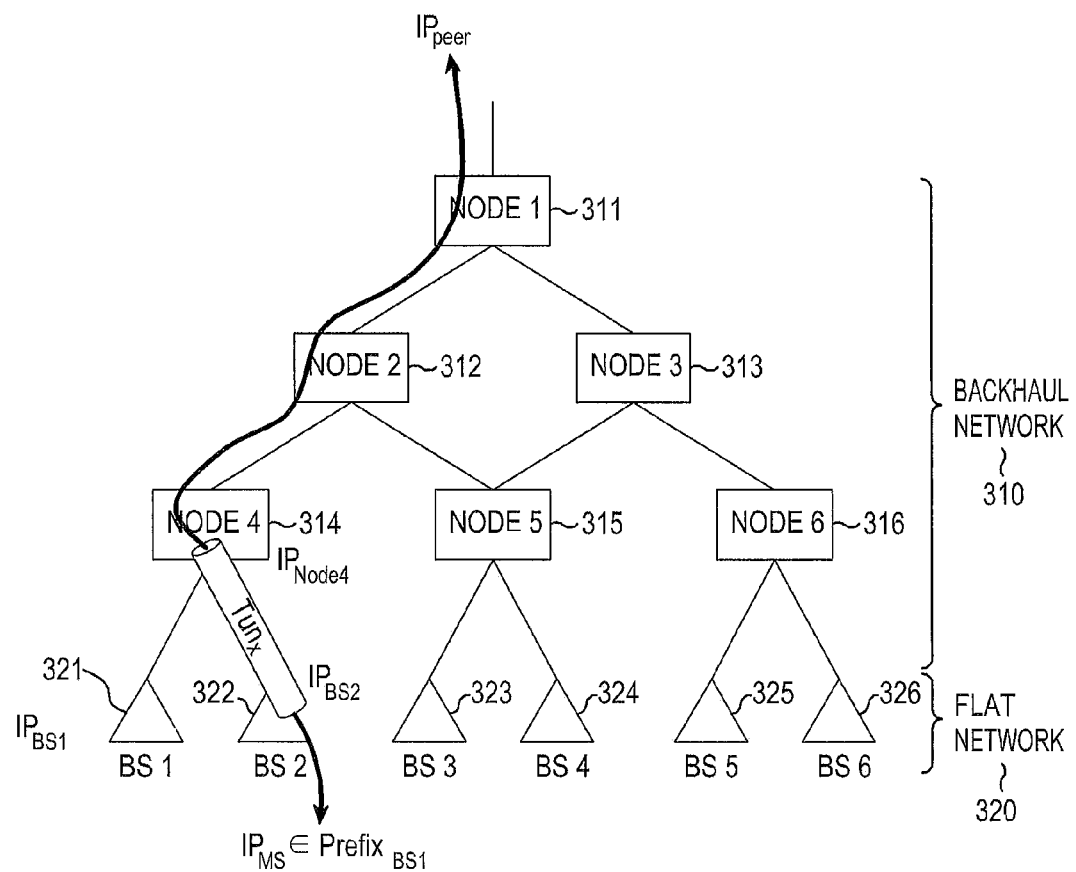
FIG. 5 schematically illustrates an example of a data-path after a short-cut tunnel is set up in a mobile communication network according to an embodiment of the present disclosure.

FIG. 5 schematically illustrates an example of a data-path after a short-cut tunnel is set up in a mobile communication network according to an embodiment of the present disclosure.

Prior to describing the embodiments with reference to FIG. 5, it will be noted that a structure of a mobile communication network in FIG. 5 is identical to a structure of a mobile communication network in each of FIG. 3 and FIG. 4.

Forwarding table entries on each network element involved in processing a data-path for an MS (not shown in FIG. 5) are illustrated in FIG. 5. $IP_{MS}$ is an IP address allocated by a BS1 321 out-of an IP prefix that is assigned to the BS1 321(Prefix$_{BS1}$). By default, an IP packet of which a destination address belongs to the Prefix$_{BS1}$ is forwarded to the BS1 321 by nodes in the backhaul network. However, upon receiving a control message form the BS1 321, a node4 314 updates a forwarding table of the node4 314 for the $IP_{MS}$, so new data IP packets process a short-cut tunnel through a BS2 312 (to which the MS is attached). It will be assumed that the BS1 321 is a source BS (s-BS) of the MS, and the BS 2 322 is a target BS (t-BS) of the MS.

In the mobile communication network, there is an accompanying control signaling between the node4 314 and the BS2 322 as well as a control signaling between the BS1 321 and the node4 314. The result of the accompanying control signaling is to set up a short-cut tunnel end-point in the BS2 322 and an addition of specific entries on a forwarding table of the BS2 322. The specific entries can ensure that the BS2 322 recognizes that the BS2 322 will directly forward an IP packet to attached MSs if the BS2 322 receives the IP packet destined to the $IP_{MS}$ through a tunnel Tun$_x$. If the BS2 322 receives an IP packet with a source address $IP_{MS}$, the IP packet with the source address $IP_{MS}$ is forwarded to the node4 314 through the tunnel Tun$_x$.

The tunnel and the forwarding entries can ensure that there is a virtual direct link between the node4 314 and the BS2 322 for the data-path of the MS.

An example of a data-path after a short-cut tunnel is set up in a mobile communication network according to an embodiment of the present disclosure has been described with reference to FIG. 5, and another example of a data-path after a short-cut tunnel is set up in a mobile communication network according to an embodiment of the present disclosure will be described with reference to FIG. 6.

Figure 6:
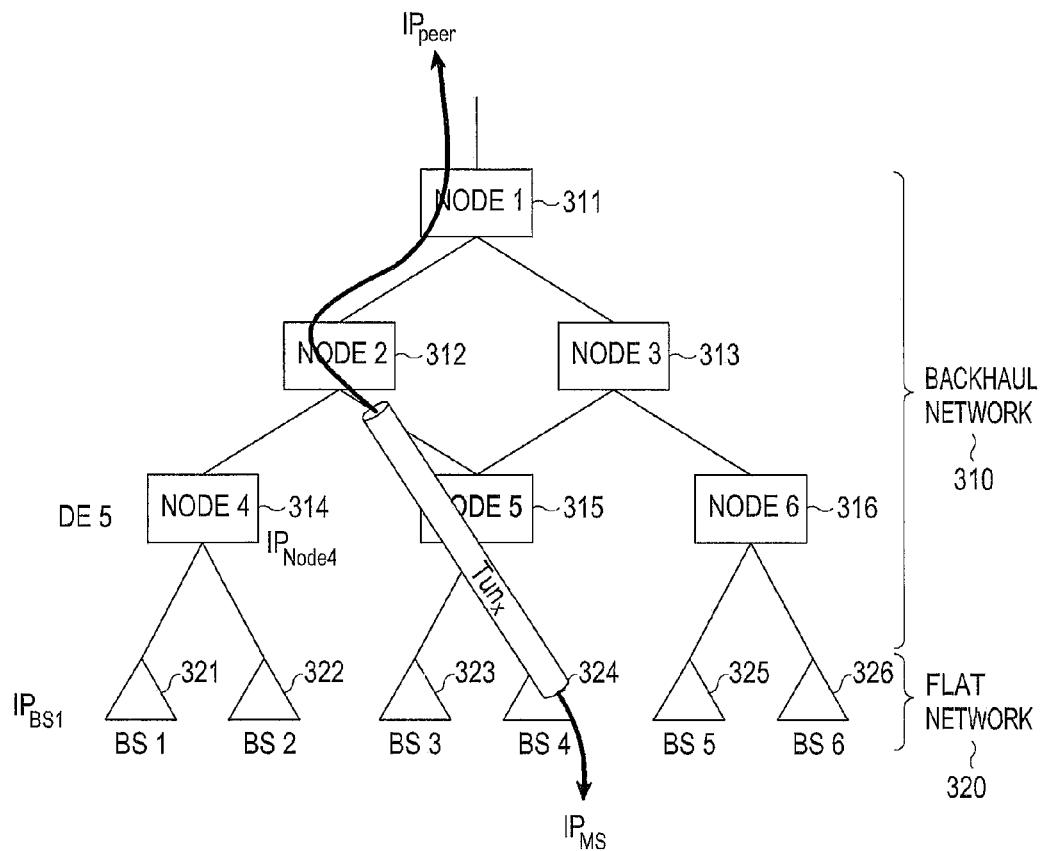
FIG. 6 schematically illustrates another example of a data-path after a short-cut tunnel is set up in a mobile communication network according to an embodiment of the present disclosure.

FIG. 6 schematically illustrates another example of a data-path after a short-cut tunnel is set up in a mobile communication network according to an embodiment of the present disclosure.

Prior to describing the embodiments with reference to FIG. 6, it will be noted that a structure of a mobile communication network in FIG. 6 is identical to a structure of a mobile communication network in each of FIG. 3 and FIG. 4.

In FIG. 6, the BS1 321 detects a general bounce-back and transmits a control message to a node4 314 as other end of the bounce-back. The node4 314 executes the same bounce-back algorithm and detects that the node4 314 has the bounce-back with a node2 312. Here, another control message is transmitted from the node4 314 to the node2 312. If the node2 312 executes the bounce-back detection algorithm, the node2 312 recognizes that IP packets are arrived from a node1 311, and will be forwarded through a node5 315. So, the node2 312 concludes that there is no more bounce-back. The control message between the node2 312 and the BS4 324 sets up the short-cut tunnel and the forwarding table entries on the node2 312 and the BS4 324.

The node2 312 in FIG. 6 and the node4 314 in FIG. 5 are called a "root of a bounce-back". The root of the bounce-back indicates that the bounce-back is the highest node in a backhaul network topology where the bounce-back stops and a short-cut tunnel is setup against a network element to which the MS is attached (e.g., the BS4 324 in FIG. 6). The bounce-back detection algorithm is initiated by a network element which assigns the IP address used by the MS (e.g., the BS1 321 which assigns $IP_{MS}$). If a bounce-back is detected, a control message is transmitted to the other end of the bounce-back, so the other end of the bounce-back performs a bounce-back detection operation. The bounce-back detection algorithm is executed in this way until the root of the bounce-back is reached.

Another example of a data-path after a short-cut tunnel is set up in a mobile communication network according to an embodiment of the present disclosure has been described with reference to FIG. 6, and a process of detecting a root of a bounce-back and setting up a short-cut tunnel in a mobile communication network according to an embodiment of the present disclosure will be described with reference to FIG. 7.

Figure 7:
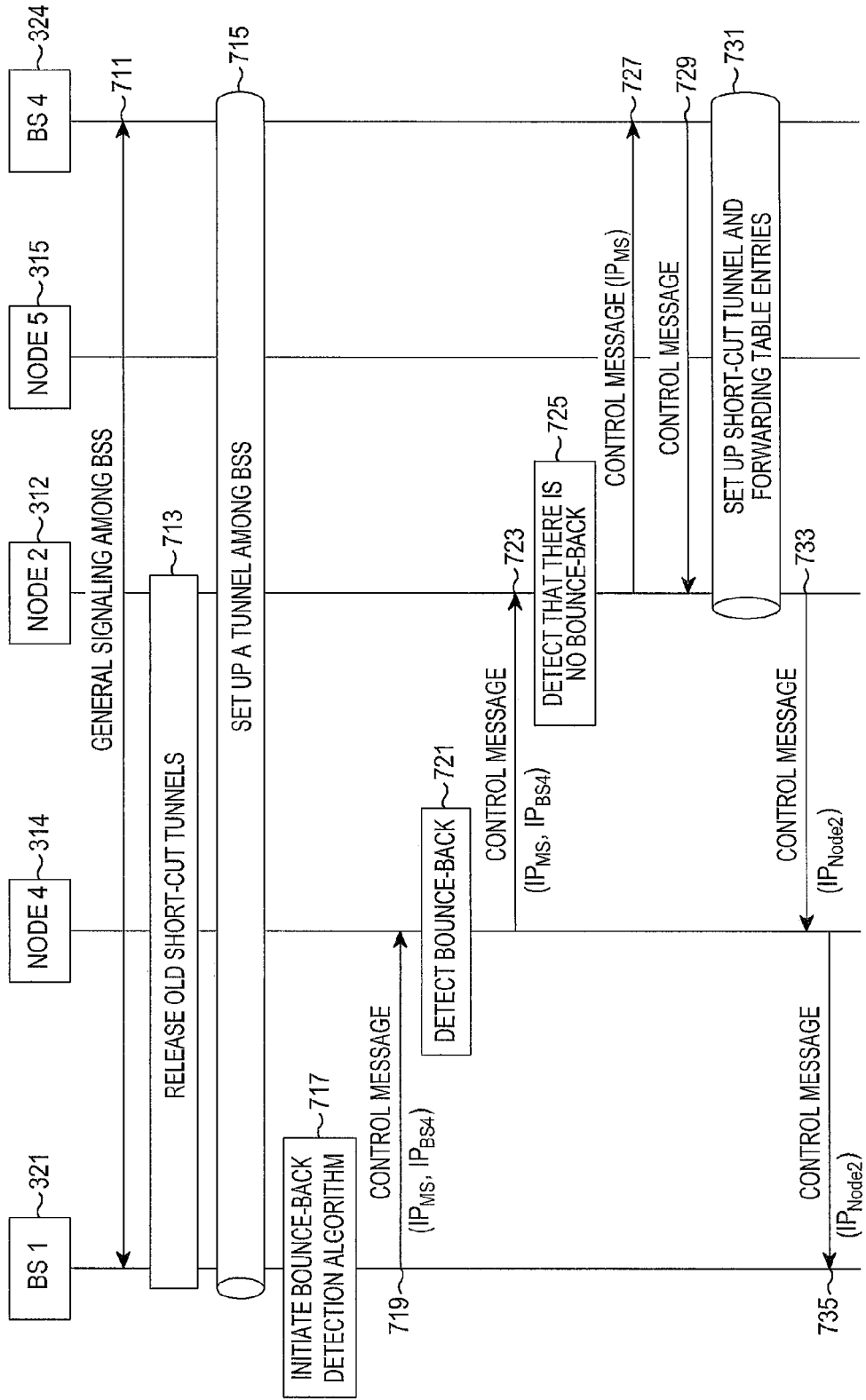
FIG. 7 schematically illustrates a process of detecting a root of a bounce-back and setting up a short-cut tunnel in a mobile communication network according to an embodiment of the present disclosure.

FIG. 7 schematically illustrates a process of detecting a root of a bounce-back and setting up a short-cut tunnel in a mobile communication network according to an embodiment of the present disclosure.

Prior to describing the embodiments with reference to FIG. 7, it will be noted that a structure of a mobile communication network in FIG. 7 is identical to a structure of a mobile communication network in each of FIG. 3 and FIG. 4.

In FIG. 7, it is assumed that an MS (not shown in FIG. 7) has already attached to a BS1 321 and acquired an IP address from the BS1 321. The acquired IP address is used for communicating with a communication peer.

Referring to FIG. 7, if the MS moves from a BS1 321 to a BS4 324, there can be a signaling between the two BSs, i.e., the BS1 321 and the BS4 324 in a mobile communication network in operation 711. If the MS attaches to other BS not the BS1 321, and there are other short-cut tunnels due to this, the other short-cut tunnels will be released in operation 713. In a mobile communication network, an inter-BS tunnel will be set up between the BS1 321 and the BS4 324 in operation 715. The inter-BS tunnel which is set up between the BS1 321 and the BS4 324 is a sub-optimal data-path that incurs bounce-backs. Even though an inter-BS tunnel is set up, the mobile communication network will try to set up another tunnel (the short-cut tunnel) to avoid use of this sub-optimal tunnel.

The BS1 321 initiates a bounce-back detection algorithm upon detecting a handover of the MS in operation 717. Upon detecting that there is a bounce-back with the node4 314, the BS1 321 transmits, to the node4 314, a control message indicating that there is a bounce back for IP packets which arrive for $IP_{MS}$ (an IP address of the MS, or a local IP address end-point of the data-path) and will be tunneled to $IP_{BS4}$ (an IP address of a t-BS) in operation 719.

If the node4 314 receives the control message, the node4 314 performs a bounce-back detection operation and detects a bounce-back with a node 2 312 in operation 721. This results in that the node4 314 transmits a control message to the node2 312 with an intention to propagate the bounce-back detection to the node 2 312 in operation 723.

The node 2 312 performs a bounce-back detection operation, and recognizes that there is no bounce-back since IP packets destined to the IPMS are arrived from a node different from a node to which the same packets are forwarded. So, the node 2 312 determines that the node 2 312 is the root of the bounce-back in operation 725.

This determination of the node2 312 prompts the node2 312 to transmit a control message to a current Access Point (AP) of the MS (a BS4 324 as the t-BS) in operation 727. The control message carries the IP address of the MS and indicates that the BS2 322 intends to set up a short-cut tunnel.

The BS4 324 verifies that the MS with a given IP address is accessed, and transmits a control message in response to the control message to the node2 312 in operation 729. At this point, the BS4 324 sets up the short-cut tunnel and the forwarding table entries.

If the node2 312 receives the control message from the BS4 324, the node2 312 sets up the short-cut tunnel and the forwarding table entries. From this timing point, the short-cut tunnel operates.

The node2 312 transmits a control message to the node4 314 in response to the control message received from the node4 314 in operation 733. The control message transmitted from the node2 312 to the node4 314 includes an IP address of the node2 312, and the IP address of the node2 312 denotes an IP address of the bounce-back.

Similarly, the node4 314 transmits a control message as a response message to the BS1 321 with the IP address of the root of the bounce-back in operation 735.

As a result, at an end of the signal flow in FIG. 7, a short-cut tunnel is set up between the root of the bounce-back and the t-BS, and the IP address of the root of the bounce-back is recognized by both the s-BS, i.e., the BS1 321 and the t-BS, i.e., the BS4 324. The last piece of information is necessary for releasing the short-cut tunnel at a later timing point as described below, so a detailed description will be omitted herein.

Although FIG. 7 illustrates a process of detecting a root of a bounce-back and setting up a short-cut tunnel in a mobile communication network according to an embodiment of the present disclosure, various changes could be made to FIG. 7. For example, although shown as a series of operations, various operations in FIG. 7 could overlap, occur in parallel, occur in a different order, or occur multiple times.

A process of detecting a root of a bounce-back and setting up a short-cut tunnel in a mobile communication network according to an embodiment of the present disclosure has been described with reference to FIG. 7, and a process of releasing a short-cut tunnel which is initiated by a s-BS in a mobile communication network according to an embodiment of the present disclosure will be described with reference to FIG. 8.

Figure 8:
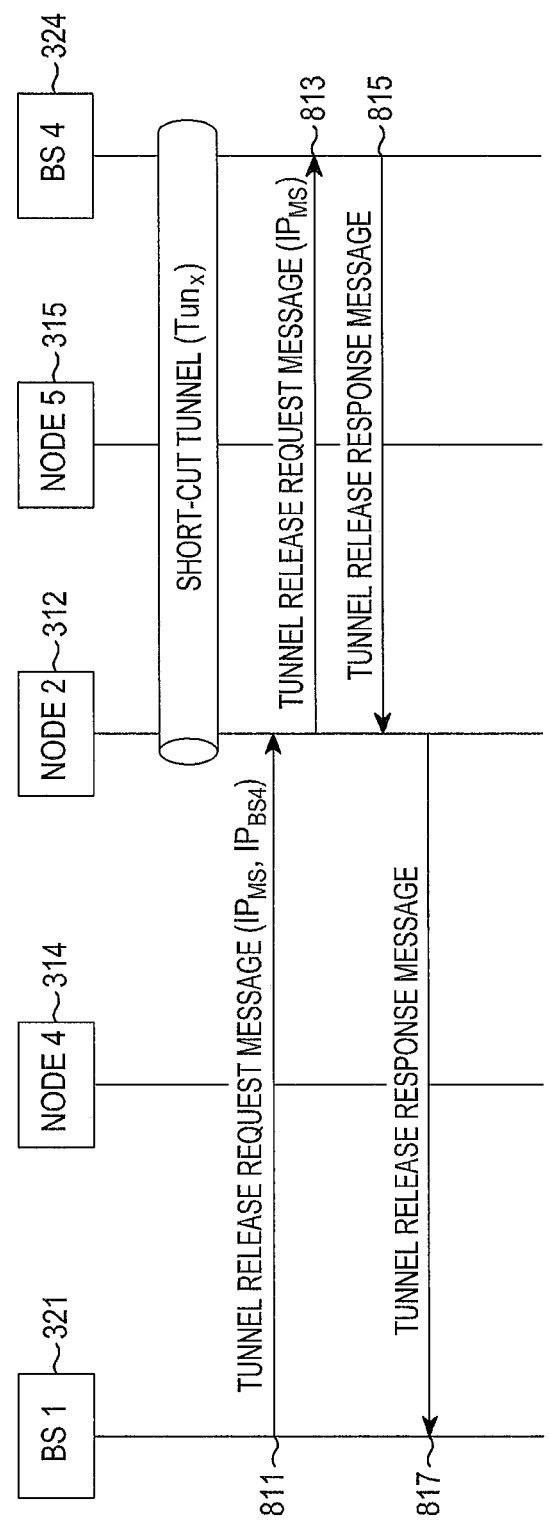
FIG. 8 schematically illustrates a process of releasing a short-cut tunnel which is initiated by a s-BS in a mobile communication network according to an embodiment of the present disclosure.

FIG. 8 schematically illustrates a process of releasing a short-cut tunnel which is initiated by a s-BS in a mobile communication network according to an embodiment of the present disclosure.

Prior to describing the embodiments with reference to FIG. 8, it will be noted that a structure of a mobile communication network in FIG. 8 is identical to a structure of a mobile communication network in each of FIG. 3 and FIG. 4.

Referring to FIG. 8, at an arbitrary timing point, a s-BS, i.e., a BS1 321 determines to release a short-cut tunnel. There can be various events which are reasons for the s-BS to determine release the short-cut tunnel, and a typical one is a case that a network access session of an MS is terminated, or a case that the MS releases an IP address acquired from the s-BS, etc. If the event is triggered, the BS1 321 determines to release the short-cut tunnel.

The BS1 321 initiates a short-cut tunnel release procedure by transmitting a control message to a root of a bounce-back, i.e., a node2 312 in operation 811. The control message includes an IP address of the MS, i.e., $IP_{MS}$ and an IP address of a t-BS, i.e., $IP_{BS4}$. For example, the control message for initiating the short-cut tunnel release procedure can be a tunnel release request message. The tunnel release request message requests to release a tunnel which has been set up.

Upon receiving the control message as described above, i.e., the control message which the s-BS transmits to the root of the bounce-back, the root of the bounce-back transmits another control message to the t-BS in operation 813. For example, the control message which the root of the bounce-back transmits to the t-BS can be a tunnel release request message.

The t-BS inspects the control message which is received in the t-BS in order to detect whether there is a short-cut tunnel for the given IP address. If there is the short-cut tunnel for the given IP address, the t-BS transmits another control message in response to the received control message, releases the short-cut tunnel for the MS, and removes the forwarding table entries in operation 815. Upon receiving another control message from the t-BS, the root of the bounce-back releases a side of the root of the bounce-back, and removes the forwarding table entries. For example, the control message transmitted from the t-BS to the root of the bounce-back can be a tunnel release response message. The tunnel release response message is a response message to the tunnel release request message.

Upon receiving the control message from the t-BS, the root of the bounce back transmits another control message to the s-BS in operation 817. For example, another control message transmitted from the root of the bounce back to the s-BS can a tunnel release response message.

Although FIG. 8 illustrates a process of releasing a short-cut tunnel which is initiated by a s-BS in a mobile communication network according to an embodiment of the present disclosure, various changes could be made to FIG. 8. For example, although shown as a series of operations, various operations in FIG. 8 could overlap, occur in parallel, occur in a different order, or occur multiple times.

A process of releasing a short-cut tunnel which is initiated by a s-BS in a mobile communication network according to an embodiment of the present disclosure has been described with reference to FIG. 8, and a process of releasing a short-cut tunnel which is initiated by a t-BS in a mobile communication network according to an embodiment of the present disclosure will be described with reference to FIG. 9.

Figure 9:
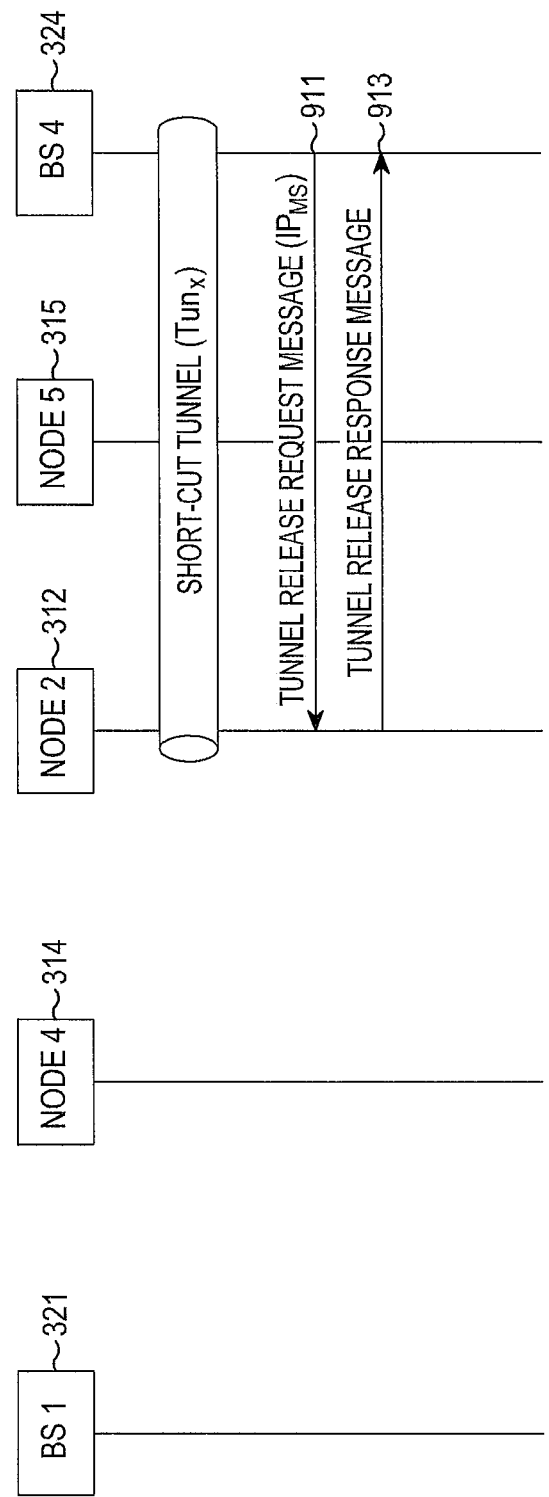
FIG. 9 schematically illustrates a process of releasing a short-cut tunnel which is initiated by a t-BS in a mobile communication network according to an embodiment of the present disclosure.

FIG. 9 schematically illustrates a process of releasing a short-cut tunnel which is initiated by a t-BS in a mobile communication network according to an embodiment of the present disclosure.

Prior to describing the embodiments with reference to FIG. 9, it will be noted that a structure of a mobile communication network in FIG. 9 is identical to a structure of a mobile communication network in each of FIG. 3 and FIG. 4.

Referring to FIG. 9, a t-BS, i.e., a BS4 324 releases a short-cut tunnel, removes forwarding table entries, and transmits a control message, e.g., a tunnel release request message to a root of a bounce-back, i.e., a node2 312 in operation 911. The tunnel release request message transmitted from the t-BS to the root of the bounce-back includes an IP address of an MS.

The root of the bounce-back releases the short-cut tunnel, removes the forwarding table entries upon receiving the control message from the t-BS, and transmits a control message, i.e., a tunnel release response message in response to the control message to the t-BS in operation 913.

Although FIG. 9 illustrates a process of releasing a short-cut tunnel which is initiated by a t-BS in a mobile communication network according to an embodiment of the present disclosure, various changes could be made to FIG. 9. For example, although shown as a series of operations, various operations in FIG. 9 could overlap, occur in parallel, occur in a different order, or occur multiple times.

The bounce-back detection algorithm on the s-BS can be triggered by one of a plurality of events. One of the events is to set up a tunnel between a new t-BS and a new BS. Another of the events is to detect that a short-cut tunnel which has been already established dose not function properly. A s-BS can detect that the event, i.e., that the short-cut tunnel which has been already established dose not function properly if the s-BS starts receiving IP packets for the MS. If the short-cut tunnel properly functions, all of the IP packets shall be tunneled between the root of the bounce-back and the t-BSs, effectively not reaching the s-BS. If the IP packets which are supposed to be processed by the short-cut tunnel start arriving at the s-BS, this indicates that the short-cut tunnel does not function properly. This event can trigger the s-BS to re-initiate the bounce-back detection algorithm. In this case, the s-BS can detect another root of a bounce-back and cause a setup of another short-cut tunnel. This is a possibility in the face of IP network topology change in a backhaul network due to added, removed, or temporarily/permanently failed nodes.

If there are a plurality of IP packet flows for the same MS, each IP packet flow can be received from a different communication peer through different data-paths in a backhaul network.

A process of optimizing a data-path if there are a plurality of multi-roots for a bounce-back in a mobile communication network according to an embodiment of the present disclosure will be described with reference to FIG. 10.

Figure 10:
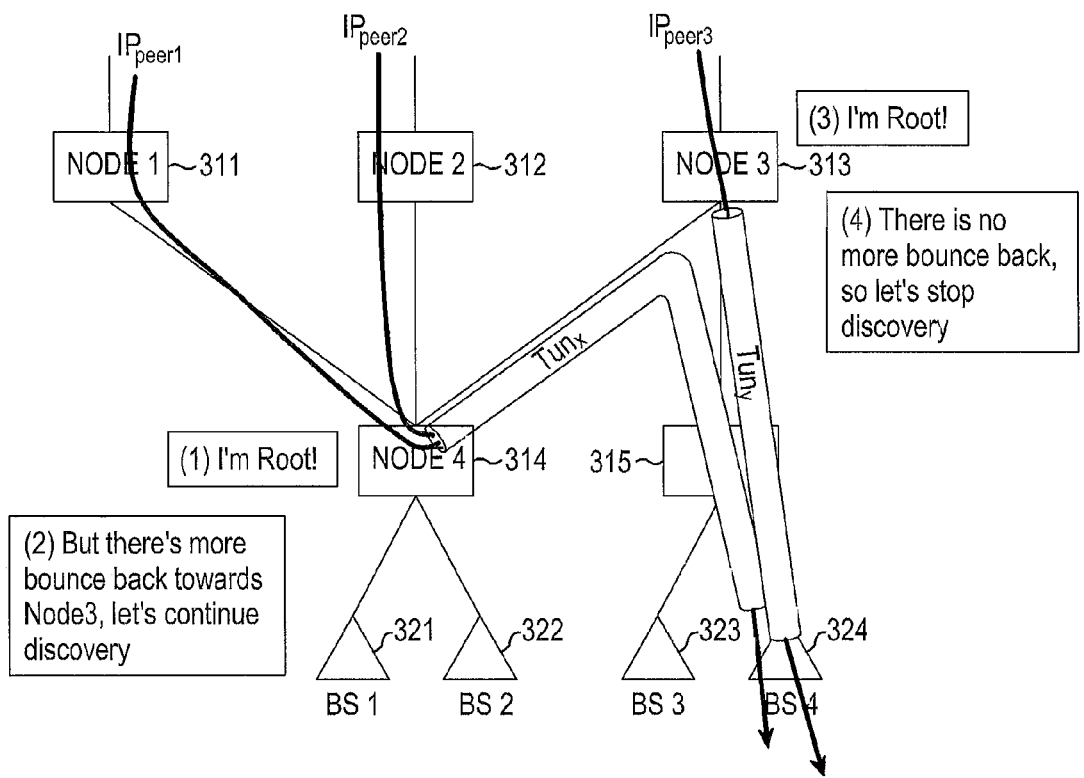
FIG. 10 schematically illustrates a process of optimizing a data-path if there are a plurality of multi-roots for a bounce-back in a mobile communication network according to an embodiment of the present disclosure.

FIG. 10 schematically illustrates a process of optimizing a data-path if there are a plurality of multi-roots for a bounce-back in a mobile communication network according to an embodiment of the present disclosure.

Prior to describing the embodiments with reference to FIG. 10, it will be noted that a structure of a mobile communication network in FIG. 10 is identical to a structure of the mobile communication network in each of FIG. 3 and FIG. 4.

Referring to FIG. 10, as in a mobile communication network, a s-BS, i.e., a BS1 321 detects a bounce-back, and transmits a control message to other end of the bounce back, i.e., a node4 314. The node4 314 executes a bounce-back detection operation, and detects that the node4 314 is a root for a part of IP packet flows. For example, the IP packet flows can include an IP packet flow between a communication peer1 and an MS, and an IP packet flow between a communication peer2 and the MS. So, the node4 314 sets up a short-cut tunnel (Tunx) with a t-BS, i.e., the node4 314. The node4 314 detects that the node4 314 is getting bounce-back for other IP packet flow, e.g., an IP packet flow between a communication peer3 and a node3 313. The node4 314 transmits a control message to the other end of the bounce-back, i.e., the node3 313 in order to trigger the bounce-back detection operation on the node4 314. For this, the node3 313 performs the bounce-back detection operation, and identifies the node3 313 as a root of other bounce-back. This results in other short-cut (TunY) which is set up between the root of the other bounce-back and the t-BS.

That is, each node that performs a bounce-back detection operation can conclude that each node can be not only a root of a bounce-back but also a bounce-back with other node or other nodes in the mobile communication network. Each node can transmit a remove message to one or more of nodes thereby propagating root detection, and the propagation of the root detection can eventually result in a plurality of short-cut tunnels in a backhaul network.

An embodiment of the present disclosure can be possible in some parts used with interior routing protocols, e.g., an Open Shortest Path First (OSPF) protocol, a Routing Information Protocol (RIP), etc.

In this case, it is assumed that an interior routing protocol is already executed within the backhaul network. The interior routing protocol can be used for control signaling among nodes within the backhaul network.

In this variant, just like in an original case, a bounce-back detection operation is performed by the s-BS, and a control message is transmitted to other end of a bounce-back if the bounce-back is detected. This control message includes information on an IP address of the MS and an IP address of the t-BS. The receiving node in the backhaul network (e.g., a node4 314 in FIG. 10) interprets the control message as a command for forwarding data traffic which is destined to a given MS IP address towards where traffic for a t-BS IP address will proceed. After this point, the command is spread across the backhaul network using interior routing protocol messages. A node which receives a control message from the s-BS interprets the control message as an interior routing protocol message which can be used within the backhaul network. A responsibility of the interior routing protocol is to set up the forwarding within the backhaul network which complies with the command.

In this case, short-cut tunnels are not set up. Instead, forwarding table entries are generated on individual nodes within the backhaul network. The forwarding table entries can ensure that each node which encounters packets designated as the IP address of the MS forwards the IP packets to the t-BS. This is also known as "injection of a host route". That is, a s-BS triggers the other end of the bounce-back to inject a host route for the MS which points towards the t-BS.

An operation process of a s-BS in a mobile communication network according to an embodiment of the present disclosure will be described with reference to FIG. 11.

Figure 11:
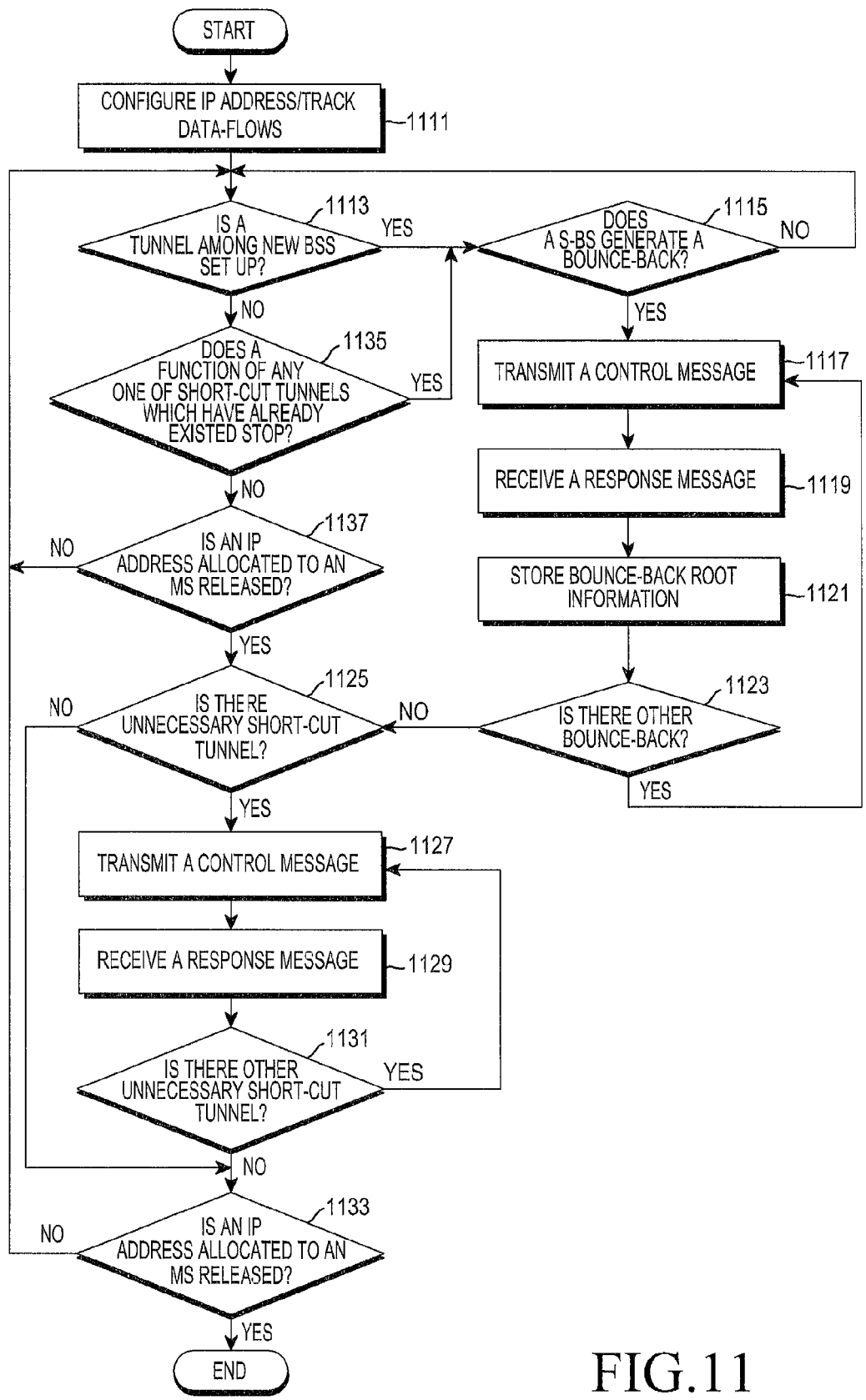
FIG. 11 schematically illustrates an operation process of a s-BS in a mobile communication network according to an embodiment of the present disclosure.

FIG. 11 schematically illustrates an operation process of a s-BS in a mobile communication network according to an embodiment of the present disclosure.

Referring to FIG. 11, the s-BS starts tracking data-flows as soon as an MS configures an IP address at operation 1111.

The s-BS determines whether a tunnel among new BSs is set up at operation 1113. If the tunnel among the new BSs is set up, the s-BS determines whether the s-BS generates a bounce-back at operation 1115. If the s-BS generates the bounce-back, the s-BS transmits a control message to other end of the bounce-back at operation 1117. The control message is used for detecting a root of the bounce-back and setting up a short-cut tunnel. The s-BS receives bounce-back root information indicating the root of the bounce-back and a response message to the control message at operation 1119. The s-BS stores the bounce-back root information at operation 1121. The s-BS determines whether there is other bounce-back at operation 1123. If there is the other bounce-back, the s-BS proceeds to the operation 1117 and performs the operations 1117 to 1121 for each of a plurality of bounce-backs which are detected by the s-BS.

If there is no other bounce-back, the s-BS determines whether there is an unnecessary short-cut tunnel at operation 1125. If there is the unnecessary short-cut tunnel, the s-BS transmits a control message to a root of a bounce-back of the unnecessary short-cut tunnel at operation 1127. The s-BS receives a response message to the control message transmitted at operation 1127 at operation 1129. The s-BS determines whether there is other unnecessary short-cut tunnel at operation 1131. If there is the other unnecessary short-cut tunnel, the s-BS proceeds to the operation 1127.

If there is no other unnecessary short-cut tunnel, the s-BS determines whether an IP address which is allocated to the MS is released at operation 1133. If the IP address which is allocated to the MS is not released, the s-BS proceeds to the operation 1113. If it is determined that the tunnel among the new BSs is not set up at the operation 1113, the s-BS proceeds operation 1135.

The s-BS determines whether a function of any one of short-cut tunnels which have already existed stops, that is, any one of short-cut tunnels which have already existed does not function properly at the operation 1135. If the function of any one of short-cut tunnels which have already existed does not stop, the s-BS determines whether the IP address which is allocated to the MS is released at operation 1137. If the IP address which is allocated to the MS is not released, the s-BS proceeds to the operation 1113. If it is determined that the IP address which is allocated to the MS is released at the operation 1137, the s-BS proceeds to the operation 1125.

Although FIG. 11 illustrates an operation process of a source BS in a mobile communication network according to an embodiment of the present disclosure, various changes could be made to FIG. 11. For example, although shown as a series of operations, various operations in FIG. 11 could overlap, occur in parallel, occur in a different order, or occur multiple times.

An operation process of a s-BS in a mobile communication network according to an embodiment of the present disclosure has been described with reference to FIG. 11, and an operation process of a backhaul network node in a mobile communication network according to an embodiment of the present disclosure will be described with reference to FIG. 12.

Figure 12:
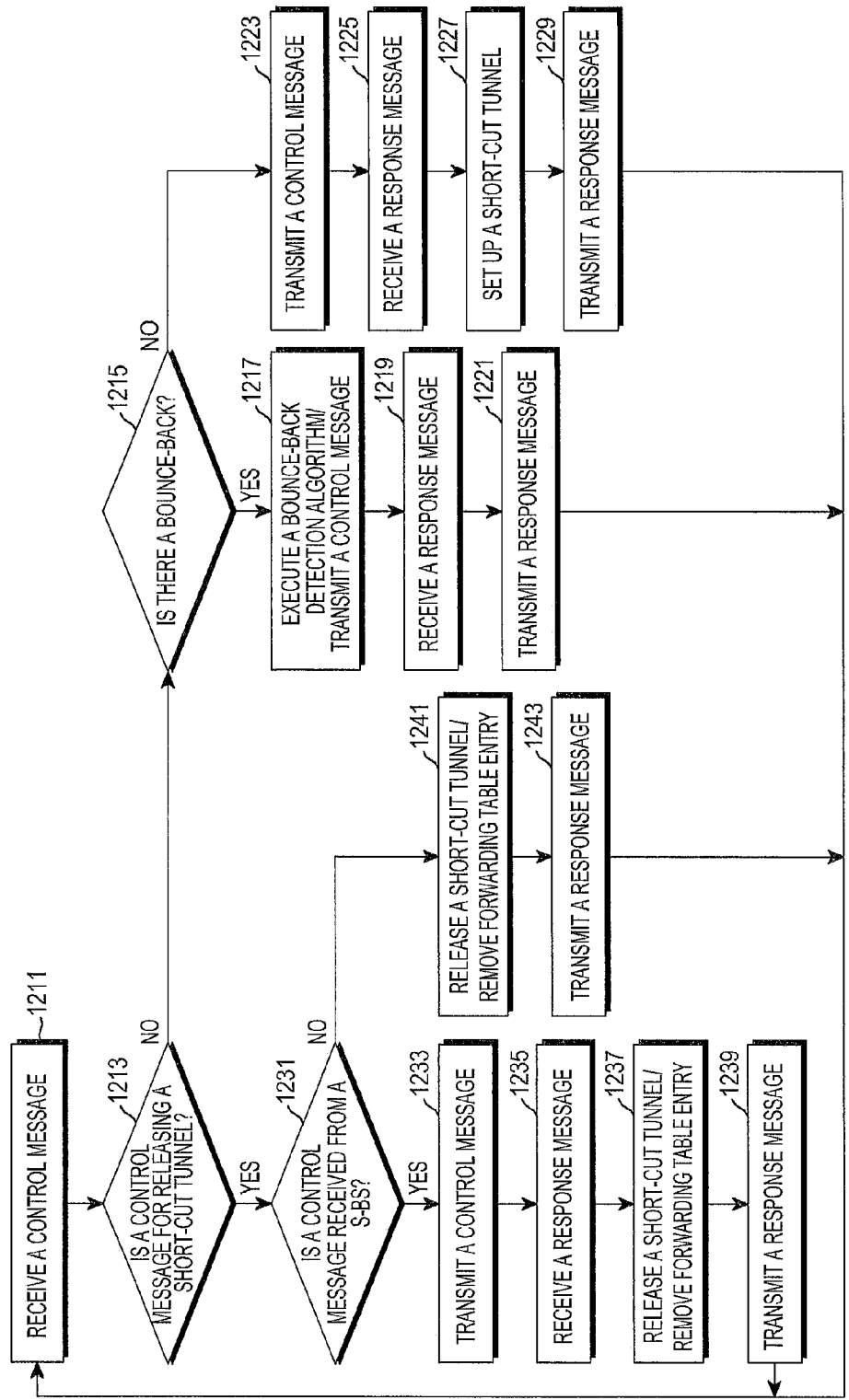
FIG. 12 schematically illustrates an operation process of a backhaul network node in a mobile communication network according to an embodiment of the present disclosure.

FIG. 12 schematically illustrates an operation process of a backhaul network node in a mobile communication network according to an embodiment of the present disclosure.

Referring to FIG. 12, the backhaul network node receives a control message from other network nodes or BSs at operation 1211.

The backhaul network node determines whether the received control message is a control message for releasing a short-cut tunnel at operation 1213. If the received control message is not the control message for releasing the short-cut tunnel, the backhaul network node determines whether there is a bounce-back at operation 1215. If there is the bounce-back, the backhaul network node executes a bounce-back detection algorithm, and transmits a control message to other end of the detected bounce-back at operation 1217. The backhaul network node receives a response message to the control message transmitted at operation 1217 at operation 1219. The backhaul network node transmits a response message to the control message received at operation 1221.

If there is no bounce-back, the backhaul network node transmits a control message to a t-BS at operation 1223. Here, "no bounce-back" means that the backhaul network node is the root of the bounce-back. The backhaul network node receives a response message to the control message transmitted at operation 1223 at operation 1225. The backhaul network node sets up a short-cut with the t-BS and generates forwarding table entry at operation 1227. The backhaul network node transmits a response message to the control message received at operation 1211 at operation 1229, and proceeds to the operation 1211.

If the received control message is the control message for releasing the short-cut tunnel, the backhaul network node determines whether the control message is received from a s-BS at operation 1231. If the control message is received from the s-BS, the backhaul network node transmits a control message to the t-BS in order to release the short-cut tunnel at operation 1233. The backhaul network node receives a response message to the control message at operation 1235. The backhaul network node releases the short-cut tunnel and removes the forwarding table entries at operation 1237. The backhaul network node transmits a response message to the control message received at operation 1211 to the s-BS at operation 1239, and proceeds to the operation 1211.

If the control message is not received from the s-BS, that is, the control message is received from the t-BS, the backhaul network node releases the short-cut tunnel and removes the forwarding table entries at operation 1241. The backhaul network node transmits a response message to the control message received at operation 1211 to the t-BS at operation 1243, and proceeds to the operation 1211.

Although FIG. 12 illustrates an operation process of a backhaul network node in a mobile communication network according to an embodiment of the present disclosure, various changes could be made to FIG. 12. For example, although shown as a series of operations, various operations in FIG. 12 could overlap, occur in parallel, occur in a different order, or occur multiple times.

An operation process of a backhaul network node in a mobile communication network according to an embodiment of the present disclosure has been described with reference to FIG. 12, and an operation process of a t-BS in a mobile communication network according to an embodiment of the present disclosure will be described with reference to FIG. 13.

Figure 13:
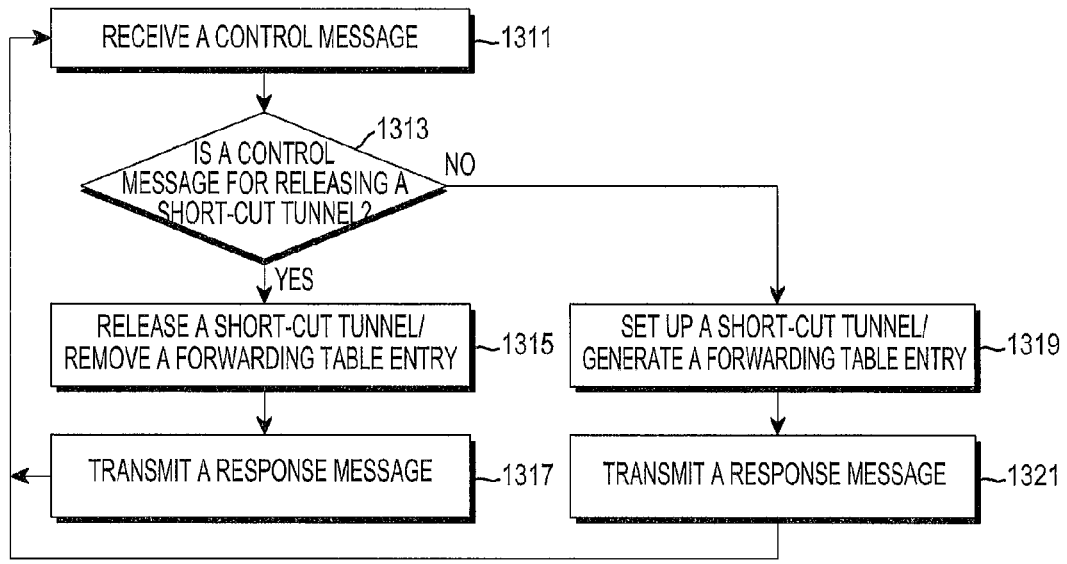
FIG. 13 schematically illustrates an operation process of a t-BS in a mobile communication network according to an embodiment of the present disclosure.

FIG. 13 schematically illustrates an operation process of a t-BS in a mobile communication network according to an embodiment of the present disclosure.

Referring to FIG. 13, a t-BS receives a control message from other network nodes or BSs at operation 1311.

The t-BS determines whether the received control message is a control message for releasing a short-cut tunnel at operation 1313. If the received control message is the control message for releasing the short-cut tunnel, the t-BS releases the short-cut tunnel and removes forwarding table entries at operation 1315. The t-BS transmits a response message to the control message received at operation 1311 to a root of a bounce-back at operation 1317, and proceeds to the operation 1311.

If the received control message is not the control message for releasing the short-cut tunnel, the t-BS sets up the short-cut tunnel and generates forwarding table entries at operation 1319. The t-BS transmits a response message to the control message received at operation 1311 to the root of the bounce-back at operation 1321, and proceeds to the operation 1311.

Although FIG. 13 illustrates an operation process of a t-BS in a mobile communication network according to an embodiment of the present disclosure, various changes could be made to FIG. 13. For example, although shown as a series of operations, various operations in FIG. 13 could overlap, occur in parallel, occur in a different order, or occur multiple times.

An operation process of a t-BS in a mobile communication network according to an embodiment of the present disclosure has been described with reference to FIG. 13, and an inner structure of a BS and a backhaul network node in a mobile communication network according to an embodiment of the present disclosure will be described with reference to FIG. 14.

Figure 14:
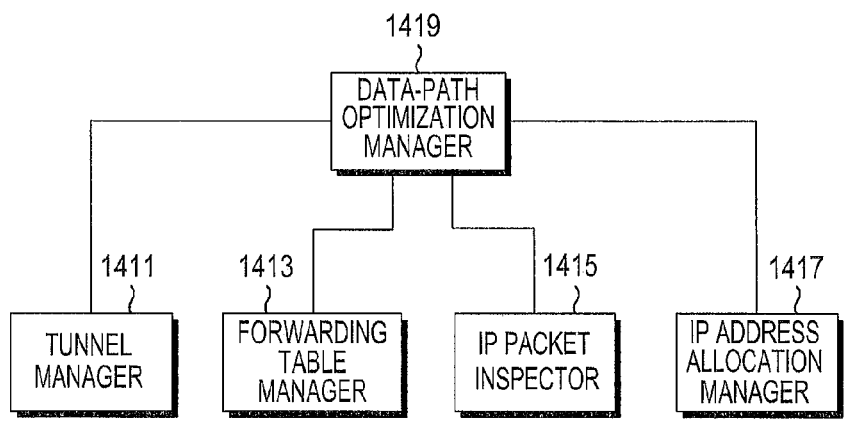
FIG. 14 schematically illustrates an inner structure of a BS and a backhaul network node in a mobile communication network according to an embodiment of the present disclosure.

FIG. 14 schematically illustrates an inner structure of a BS and a backhaul network node in a mobile communication network according to an embodiment of the present disclosure.

Referring to FIG. 14, the BS and the backhaul network node include a tunnel manager 1411, a forwarding table manager 1413, an IP packet inspector 1415, an IP address allocation manager 1417, and a data-path optimization manager 1419.

The tunnel manager 1411 performs an operation of setting up and releasing tunnels between a network element, e.g., a node which is located in a backhaul network and other network element, e.g., a t-BS. The tunnels can be IP-in-IP tunnels, or other types of tunnels.

The forwarding table manager 1413 performs an operation of generating and removing entries. The forwarding table manager 1413 determines how each IP packet is forwarded by the network element such as the BS or the backhaul node. Upon being requested by an external entity such as the data-path optimization manager 1419, the forwarding table manager 1413 can return a current forwarding table entry/entries for a related MS.

The IP packet inspector 1415 performs an operation of returning a source link-layer address of received packets that are transmitted to a given destination IP address, e.g., an IP address of the MS. The IP packet inspector 1415 is used for determining where IP packets that are destined to the IP address of the MS are input from, i.e., which node transmits the IP packets to the receiving network element. The IP packet inspector 1415 can be instructed to alert an external entity, e.g., the data-path optimization manager 1419 if the IP packet inspector 1415 starts receiving any or heavy loads of traffic heading towards a given IP address. The IP packet inspector 1415 is used for detecting if an old short-cut tunnel stops functioning, so the network element receives IP packets which are supposed to be processed by another network element with the short-cut tunnel.

The IP address allocation manager 1417 performs an operation of allocating an IP address to the MS and releasing the IP address which is allocated to the MS. The IP address allocation manager 1417 is applied to BSs which operate as a default gateway for the MS. The IP address allocation manager 1417 can notify an external entity, e.g., the data-path optimization manager 1419 if a new IP address is allocated to the MS, or an old IP address of the MS is released. For example, the IP address allocation manager 1417 can be implemented as a Dynamic Host Configuration Protocol (DHCP) server.

The data-path optimization manager 1419 performs an operation of exchanging control messages with data-path optimization managers included in other network elements, executing a bounce-back algorithm, releasing short-cut tunnels, and setting up and removing forwarding table entries.

The data-path optimization manager 1419 interacts with the tunnel manager 1411 for setting up or releasing short-cut tunnels.

The data-path optimization manager 1419 interacts with the forwarding table manager 1413 for setting up forwarding table entries if a new short-cut tunnel is set up, for removing forwarding table entries if the new short-cut tunnel is released, and for determining a current data-path for an IP address, e.g., an IP address of the MS if the bounce-back detection algorithm is executed.

The data-path optimization manager 1419 interacts with the IP packet inspector 1415 for getting triggered if an old short-cut tunnel stops functioning, and for acquiring a link-layer source address of packets received for a given destination IP address.

The data-path optimization manager 1419 interacts with the IP address allocation manager 1417 for getting triggered if the new IP address is allocated to the MS, or the old IP address of the MS is released.

While the tunnel manager 1411, the forwarding table manager 1413, the IP packet inspector 1415, the IP address allocation manager 1417, and the data-path optimization manager 1419 are shown in FIG. 14 as separate units, it is to be understood that this is merely for convenience of description. In other words, two or more of the tunnel manager 1411, the forwarding table manager 1413, the IP packet inspector 1415, the IP address allocation manager 1417, and the data-path optimization manager 1419 can be incorporated into a single unit.

As not shown in an additional FIG, each of a BS and a backhaul network within the mobile communication network can include a transmitter for various signals and messages, a receiver for receiving various signals and messages, and a controller for controlling the overall operation.

Networks which are appropriate for embodiments of the present disclosure are a mobile access network and a radio access network such as WiFi™-based hotspots, or a cellular-based 3GPP network, a 3GPP2 network, and a WiMAX™ network. Other wireless and wired networks can be subject to utilizing the present disclosure.

The common characteristic of networks that can be used in embodiments of the present disclosure is the following:

Networks which can be used in embodiments of the present disclosure include hosts which desire to receive IP packets if the host uses an IP address that is topologically incorrect with respect to an access point of the host in the network. In such case, the IP packets will follow a sub-optimal data-path in order to reach the host. And, such paths will consume more necessary network resources than necessary.

As is apparent from the foregoing description, an embodiment of the present disclosure enables to optimize a data-path by removing a bounce-back in a mobile communication network.

An embodiment of the present disclosure can be applied to any network where one or more hosts desire to change points of attachment to the network while use of the same IP address is maintained. The change of the points of attachment can result in a host being connected to a different IP subnet in the network, so a change of an IP address can be required. However, the host can desire keeping the IP address unchanged in order to maintain ongoing IP sessions and IP reachability at a fixed IP address, and the networks will be sub-optimal data-paths. So, an embodiment of the present disclosure enables to optimize the data-paths.

Certain aspects of the present disclosure can also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software can be stored in a non-volatile storage, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, e.g., computer-readable, storage medium, e.g., a Compact Disk (CD), a Digital Versatile Disk (DVD), a magnetic disk, or a magnetic tape. A method and apparatus according to an embodiment of the present disclosure can be implemented by a computer or a mobile terminal that includes a controller and a memory, and the memory can be an example of a non-transitory machine-readable, e.g., computer-readable, storage medium suitable to store a program or programs including instructions for implementing various embodiments of the present disclosure.

The present disclosure can include a program including code for implementing the apparatus and method as defined by the appended claims, and a non-transitory machine-readable, e.g., computer-readable, storage medium storing the program. The program can be electronically transferred via any media, such as communication signals, which are transmitted through wired and/or wireless connections, and the present disclosure can include their equivalents.

An apparatus according to an embodiment of the present disclosure can receive the program from a program providing device which is connected to the apparatus via a wire or a wireless and store the program. The program providing device can include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for setting up a data-path by a source base station (BS) in a mobile communication network, the method comprising:
   determining whether there is a network element pair in which a data packet is transmitted back and forth in a new tunnel if the new tunnel is set up while tracking a data-flow for a mobile station (MS);
   when there is at least one network element pair, transmitting a message for detecting a root of a specific network element pair among the at least one network element pair and setting up a short-cut tunnel to other end of the specific network element pair; and
   receiving a message including root information related to the root of the specific network element pair from the specific network element pair.

2. The method of claim 1, further comprising:
   when the at least one network element pair includes at least two network element pairs, receiving a message including root information for each of remaining network element pairs except for the specific network element pair among the least two network element pairs by repetitively performing the transmitting operations for each of the remaining network element pairs.

3. The method of claim 2, further comprising:
   when the at least one network element pair does not include other network element pair except for the specific network element pair, determining whether there is a unnecessary short-cut tunnel; and
   when there is at least one unnecessary short-cut tunnel, transmitting a message which requests to release a specific unnecessary short-cut tunnel among the at least one unnecessary short-cut tunnel to a root for the specific unnecessary short-cut tunnel.

4. The method of claim 3, further comprising:
   when the at least one unnecessary short-cut tunnel includes at least two unnecessary short-cut tunnels, transmitting a message which requests to release each of remaining unnecessary short-cut tunnels except for the specific unnecessary short-cut tunnel among the at least two unnecessary short-cut tunnels to a root of each of the remaining unnecessary short-cut tunnels.

5. The method of claim 1, further comprising:
when the new tunnel is not set up, determining whether there is a short-cut tunnel of which a function has stopped among short-cut tunnels which have already existed; and
when there is at least one short-cut tunnel of which a function has stopped among the short-cut tunnels which have already existed, returning to the determination operation.

6. A method for setting up a data-path by a backhaul network node in a mobile communication network, the method comprising:
when a received message is not a message that requests to release a short-cut tunnel, determining whether there is a network element pair in which a data packet is transmitted back and forth; and
when there is the network element pair, executing a network element pair detection algorithm and performing an operation related to the message with other end of the network element pair.

7. The method of claim 6, further comprising:
when the received message is the message which requests to release the short-cut tunnel, releasing the short-cut tunnel with a target base station (BS).

8. The method of claim 7, wherein, when the received message is a message received from a source BS, the releasing of the short-cut tunnel with the target BS comprises releasing the short-cut tunnel with the target BS by transmitting the message to the target BS.

9. A method for setting up a data-path by a target Base Station (BS) in a mobile communication network, the method comprising:
when a message that requests to release a short-cut tunnel is received, releasing the short-cut tunnel; and
transmitting a response message to the message to a root for a network element pair in which a data packet is transmitted back and forth.

10. The method of claim 9, further comprising:
when the received message is not the message that requests to release the short-cut tunnel, generating the short-cut tunnel; and
transmitting the response message to the message to the root for the network element pair.

11. A source base station (BS) in a mobile communication network, the source BS comprising:
a processor configured to:
determine whether there is a network element pair in which a data packet is transmitted back and forth in a new tunnel when the new tunnel is set up while tracking a data-flow for a mobile station (MS);
transmit a message for detecting a root of a specific network element pair among at least one network element pair and setting up a short-cut tunnel to other end of the specific network element pair when there is the at least one network element; and
receive a message including root information related to the root of the specific network element pair from the specific network element pair.

12. The source BS of claim 11, wherein, when the at least one network element pair includes at least two network element pairs, the processor receive a message including root information for each of the remaining network element pairs except for the specific network element pair among the least two network element pairs by repetitively performing the transmitting operation for each of the remaining network element pairs.

13. The source BS of claim 12, wherein the processor is configured to:
determine whether there is a unnecessary short-cut tunnel when the at least one network element pair does not include other network element pair except for the specific network element pair; and
transmit a message that requests to release a specific unnecessary short-cut tunnel among at least one unnecessary short-cut tunnel to a root for the specific unnecessary short-cut tunnel when there is the at least one unnecessary short-cut tunnel.

14. The source BS of claim 13, wherein the processor is configured to transmit a message that requests to release each of remaining unnecessary short-cut tunnels except for the specific unnecessary short-cut tunnel among at least two unnecessary short-cut tunnels to a root of each of the remaining unnecessary short-cut tunnels when the at least one unnecessary short-cut tunnel includes the at least two unnecessary short-cut tunnels.

15. The source BS of claim 11, wherein the processor is configured to:
determine whether there is a short-cut tunnel of which a function has stopped among short-cut tunnels which have already existed if the new tunnel is not set up; and
repetitively perform the determining operation if there is at least one short-cut tunnel of which a function has stopped among the short-cut tunnels that have already existed.

16. A backhaul network node in a mobile communication network, the backhaul network node comprising:
a processor configured to:
determine whether there is a network element pair in which a data packet is transmitted back and forth when a received message is not a message which requests to release a short-cut tunnel; and
execute a network element pair detection algorithm; and perform an operation related to the message with other end of the network element pair when there is the network element pair.

17. The backhaul network node of claim 16, wherein the processor is configured to release the short-cut tunnel with a target base station (BS) when the received message is the message which requests to release the short-cut tunnel.

18. The backhaul network node of claim 17, further comprising:
a transmitter,
wherein the controller is configured to release the short-cut tunnel with the target BS by controlling the transmitter to transmit the message to the target BS.

19. A target base station (BS) in a mobile communication network, the target BS comprising:
a processor configured to:
release a short-cut tunnel when the received message is a message that requests to release the short-cut tunnel; and
transmit a response message to the message to a root for a network element pair in which a data packet is transmitted back and forth.

20. The target BS of claim 19, wherein the processor is configured to generate the short-cut tunnel when the received message is not a message that requests to release the short-cut tunnel, and
transmit the response message to the message to the root for the network element pair.

* * * * *